United States Patent
Vanjani

[19]

[11] Patent Number: 6,104,112
[45] Date of Patent: Aug. 15, 2000

[54] BRUSHLESS ELECTRIC MOTOR ASSEMBLY

[76] Inventor: Chandu R. Vanjani, 16753 Shoenborn St., North Hills, Calif. 91343

[21] Appl. No.: 09/377,547

[22] Filed: Aug. 19, 1999

[51] Int. Cl.[7] .................................................. H02K 1/32
[52] U.S. Cl. ..................... 310/64; 310/67 R; 310/68 R; 310/68 C; 310/91; 310/98; 310/99
[58] Field of Search .................... 310/64, 67 R, 310/68 R, 99, 98, 91, 68 C, 83

[56] References Cited

U.S. PATENT DOCUMENTS

| Re. 34,268 | 6/1993 | Muller | 310/67 R |
|---|---|---|---|
| 4,074,157 | 2/1978 | Lace | 310/67 R |
| 4,286,198 | 8/1981 | De Valroger | 318/138 |
| 4,698,542 | 10/1987 | Muller | 310/67 R |
| 5,481,143 | 1/1996 | Burdick | 310/68 B |
| 5,998,893 | 12/1999 | Fowler et al. | 310/68 R |

*Primary Examiner*—Clayton LaBalle
*Assistant Examiner*—Thanh Lam
*Attorney, Agent, or Firm*—Jack C Munro

[57] ABSTRACT

A compact, self contained brushless motor assembly which has a stator fixedly mounted onto a hub. Located about the stator is a rotor with a shaft being connected to the rotor which is conducted through a center through hole formed within the hub. A heat sink is attached to the hub. A controller is mounted onto the heat sink with heat generated by the controller to be dissipated by the heat sink. Rotation of the rotor causes rotation of a shaft which passes through the center through hole with this shaft to be optionally connectable to a planetary gear system. The planetary gear system is to be mounted within an alcove formed within the heat sink.

4 Claims, 3 Drawing Sheets

BRUSHLESS ELECTRIC MOTOR ASSEMBLY

BACKGROUND OF THE INVENTION

1) Field of the Invention

The field of this invention relates to brushless electric motors and more particularly to a compact, small in size, powerful electric motor which has an internal controller which can be used to drive a vehicle, such as a bicycle.

2) Description of the Prior Art

Although the electric motor of the present invention has been found to have particular utility in conjunction with an electrically operated bicycle, the motor is also deemed to have utility in other environments such as operating of a scooter and even other environments that are unknown to the inventor at this particular time.

Electric motors have been used in the past to operate a bicycle electrically. The electric motors of the prior art have been rather large in size and are of relatively heavy weight. It is desirable to have the electric motor be as small as possible and also to have the motor be as light in weight as possible to thereby keep the overall weight of the bicycle as low as possible. Also, electric motors of bicycles of the prior art have exposed internal components. Bicycles are frequently ridden through adverse weather conditions which can result in water and foreign material, such as mud, contaminating the internal components of the electric motor.

Electric motors require the use of an electronic controller which control the different speeds that the motor is operated. In the past, it has been common to use a controller that is mounted separate from the motor. Additionally, such prior art motors have the problem of overheating. Once the motor is overheated, it is necessary to shut down the motor for a given period of time before reoperation can begin. This means that if the motor is mounted on a bicycle, the only way the bicycle can be operated is manually when the motor is overheated.

Additionally, it is normally desirable to use a planetary gear system in conjunction with the electric motor. The function of the planetary gear system is to gear down the output shaft of the motor to the driving wheel of the bicycle so as to keep the driving wheel operating within a desirable range of revolutions per minute. In the past, in conjunction with bicycles, the planetary gear system is mounted separate from the motor.

SUMMARY OF THE INVENTION

The electric motor of this invention is designed to form a small in size, compact unit which is completely enclosed, is light in weight and is to include a controller not requiring a separate controller and also can include a planetary gear system not requiring a separate planetary gear system. The electric motor is constructed of a disc shaped heat sink to which is integrally connected a hub with the hub being of a substantially smaller diameter than the heat sink. A central through hole is conducted through the hub and the heat sink. Fixedly mounted on the hub is a stator. Electronic components of a controller are mounted on an annular ledge of the heat sink with both the stator and the controller to be located internally of a rotor which is mounted about the stator. The rotor is connected to a shaft, the shaft extending through the central through hole. A cover completely covers the rotor and is attached to the heat sink forming a totally enclosed unit. The shaft is to be connectable to a planetary gear system.

DETAILED DESCRIPTION OF THE PREFERRED EMBODIMENT

Figure 1:
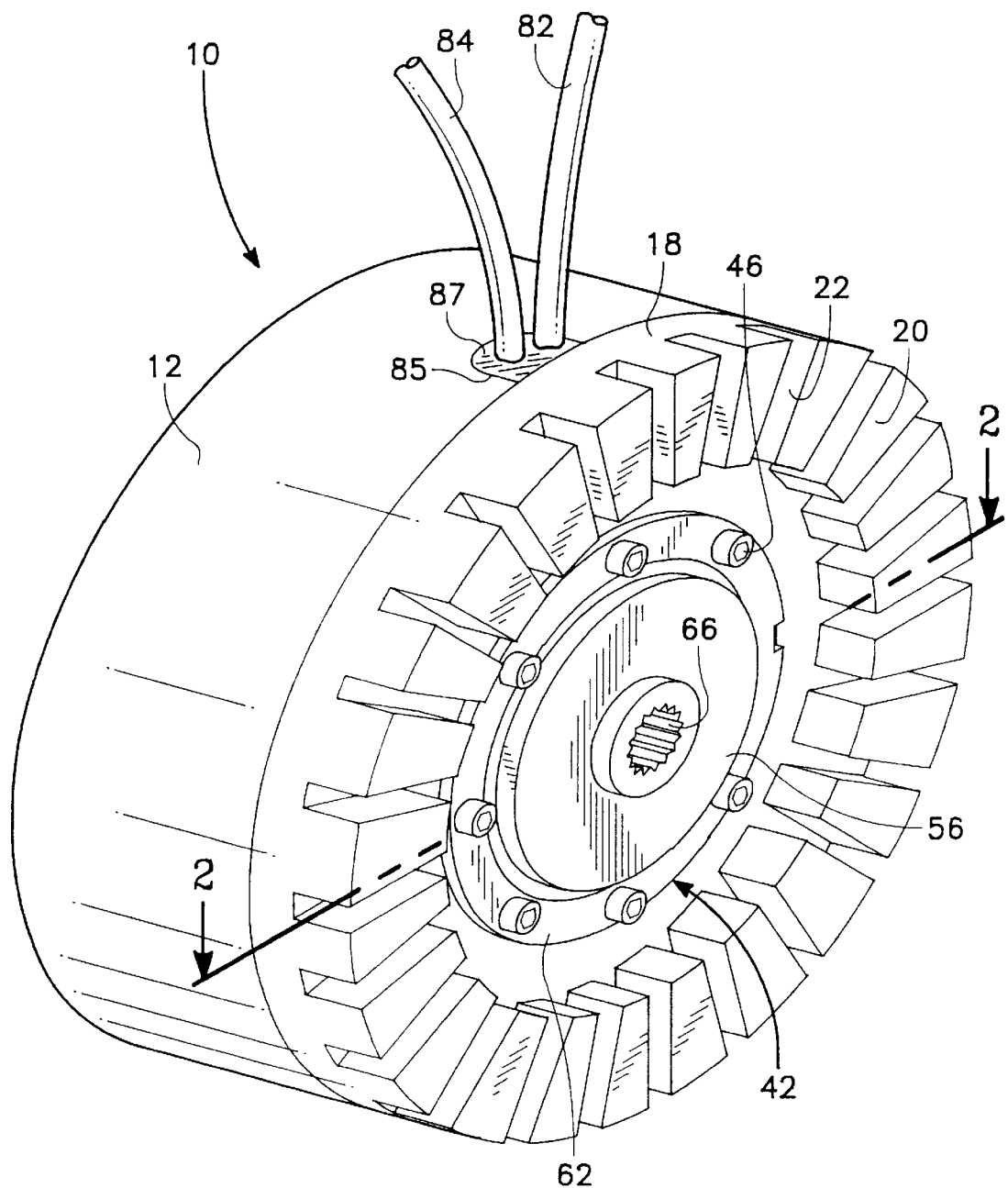
FIG. 1 is an external isometric view of the electric motor assembly of this invention.
Figure 2:
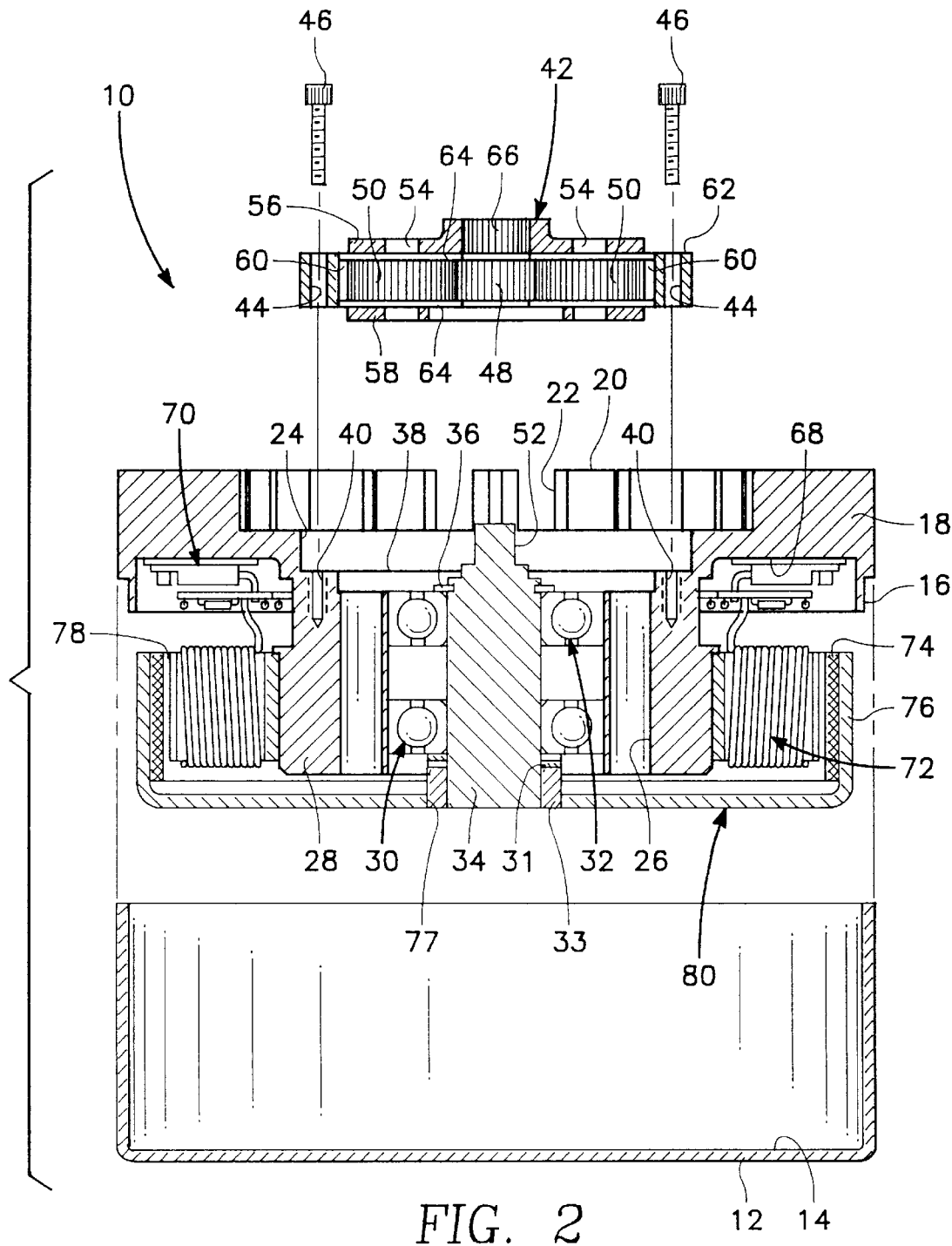
FIG. 2 is an exploded transverse cross-sectional view of the electric motor assembly of the present invention taken along line 2—2 of FIG. 1.
Figure 3:
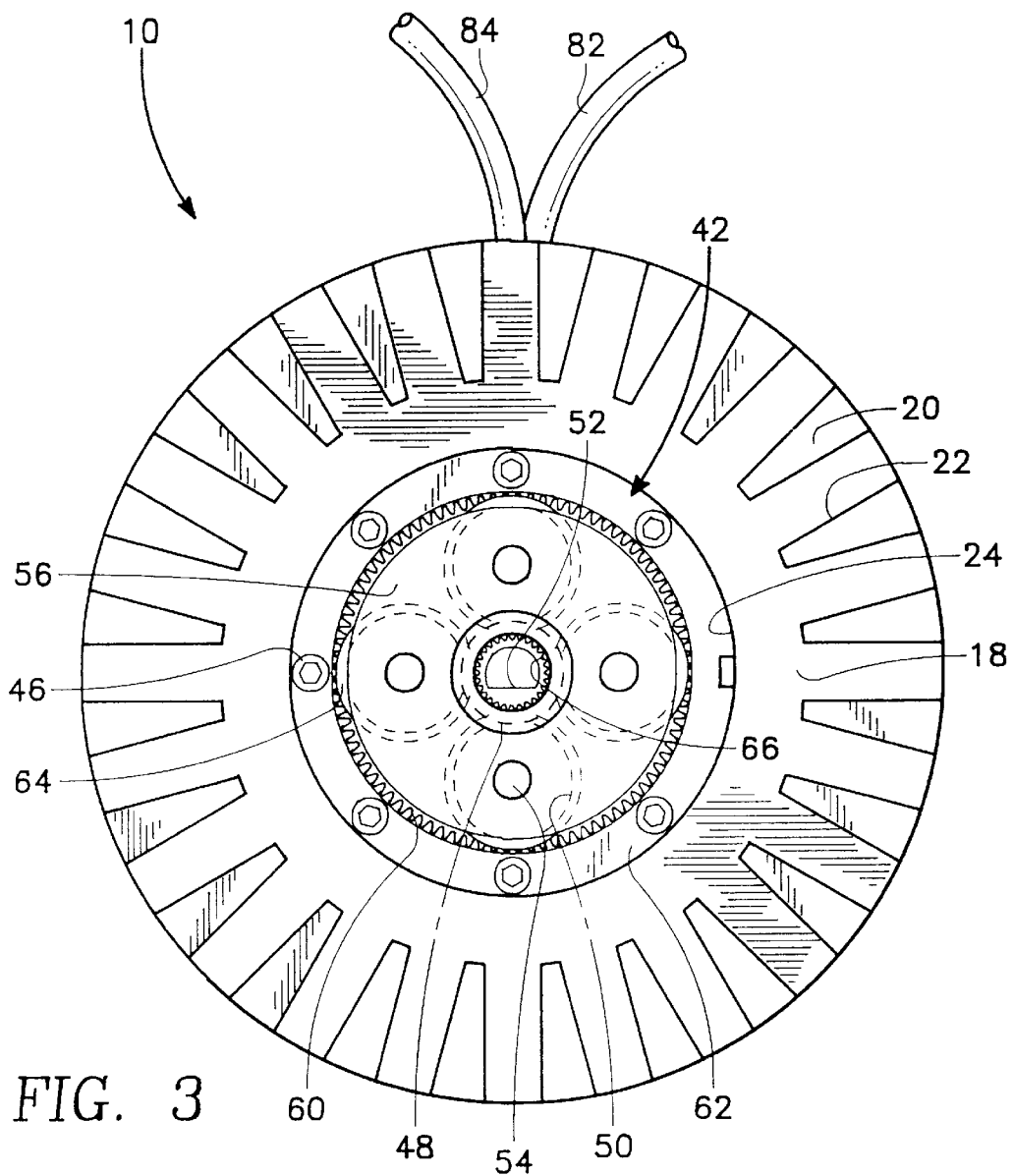
FIG. 3 is a frontal view of the heat sink incorporated within the electric motor assembly of the present invention showing the gear arrangement of the planetary gear system which is mounted in conjunction with the electric motor assembly of this invention.

Referring particularly to the drawings, there is shown the electric motor assembly 10 of this invention which includes a cylindrically shaped cover 12 which has an internal compartment 14. The cover 12 is open at one end and is to be secured at annular groove 16 to a disc shaped heat sink 18. The heat sink 18 is constructed of a material such as aluminum that readily conducts heat. The heat sink 18 includes a mass of fins 20 with a radial groove 22 located between each directly adjacent pair of the fins 20. The function of the radial grooves 22 is to facilitate the conducting of heat from the fins 20 of the heat sink 18 into the ambient.

The heat sink 18 includes an alcove 24. The alcove 24 is basically cylindrically shaped and has a center through opening 26 connecting therewith. The center through opening 26 is formed through a hub 28 which is integral with the heat sink 18. Heat sink 18 is constructed of a material that readily conducts heat, such as aluminum. Mounted within the center through opening 26 are bearings 30 and 32. Low frictionally supported by the bearings 30 and 32 is a shaft 34. The shaft 34 is longitudinally fixed in position relative to bearing 32 by means of snap ring 36. The bearing 30 is preloaded by a preload disc leaf spring 31 which is held in place against bearing 30 by a bushing 33 which is mounted on shaft 34.

Mounted within the surface 38 of the hub 28 are a plurality of even spaced apart threaded holes 40. A planetary gear housing 42 is to be mounted within the alcove 24 in a close conforming manner. The planetary gear housing 42 includes a series of evenly spaced apart holes 44. Within each hole 44 there is to be located a threaded fastener 46 with each threaded fastener 46 to be threadably engaged with one of the threaded holes 40. This will securely mount the planetary gear housing 42 within the alcove 24.

Within the planetary gear housing 42 there is mounted a sun gear 48 about which are mounted four in number of planet gears 50. The four planet gears 50 engage with the sun gear 48 within which there is located a spline connection, which is not shown. The spline connection of the sun gear 48 is to mechanically engage with the spline section 52 of the shaft 34. Each of the planet gears 50 are rotatably mounted on separate stub shafts 54. The four in number of stub shafts 54 are fixedly mounted between an upper plate 56 and a lower plate 58. The planet gears 50 are in engagement with the ring gear 60 formed internally of a ring member 62. On each side of each planet gear 50 there is mounted a washer 64. The diameter of each washer 64 is slightly larger than the diameter of each planet gear 50. It is to be understood that the planet gears 50 are all of the same diameter. It is also to be noted that the sun gear 48 is of a substantially smaller diameter than the planet gears 50. The washers 64 function to keep the planet gears 50 longitudinally locked in position with the ring gear 60 by each washer 64 abutting against an edge of the ring gear 60. The upper plate 56 is locked to the lower plate 58 by means of the stub shafts 54. The upper plate 56 includes a spline connection 66. The spline connection 66 is to connect to a driven shaft, which is not shown. The driven shaft will then connect with the driving wheel of a bicycle and cause the bicycle to be motor operated.

The heat sink 18 has an internal annular ledge 68. Mounted on the annular ledge 68 are the power devices of the electronic components 70 of an electronic controller. The function of the electronic controller is that is will control the variable speed at which the bicycle will be operated. The controller also will shut down the motor 10 if the motor 10 becomes overheated. The controller will also shut off the motor 10 if the driving wheel of the bicycle becomes locked. The controller will also shut off the motor 10 if the throttle cable, which controls the speed that the motor 10 is driven, becomes broken rather than having the motor just being driven at maximum operating speed. Also, the controller requires that the throttle has to be in zero speed position even before the motor will operate.

It is to be understood that the electric motor 10 of the present invention could be utilized to operate a scooter, rather than a bicycle with the only difference being that the motor for the scooter might be a little larger in size. Within usage of a scooter, it may not be necessary to include a planetary gear system.

Mounted on the exterior surface of the hub 28 is a stator 72. The stator 72 is fixed to the hub 28. Mounted about the stator 72 is a magnet ring 74, having multiple magnet poles, which is mounted on the inner annular surface of a rotor yoke 76. It is to be understood that the magnet ring 74 is slightly spaced from the stator 72 forming an annular gap 78. The rotor yoke 76 is centrally secured to the shaft 34. The rotor yoke 76 and the magnet ring 74 form the rotor 80 of the motor 10 of this invention. The rotor yoke 76 has a hole 77 within which is located the bushing 33.

The rotor 80 is to be positioned within the internal compartment 14 of the cover 12 and is to be permitted to freely rotate. Electrical operation of the stator 72 and the electronic component 70 of the controller is accomplished by means of the electrical wires 82 and 84. Wires 82 and 84 pass through hole 85 in cover 12. The space surrounding wires 82 and 84 within hole 85 is sealed by epoxy resin 87. Electrical activation of the stator 72 will cause the rotor 80 to rotate which in turn will rotate the shaft 34. The spline section 52 will cause rotation of the sun gear 48 which will cause the planet gears 50 to rotate around the sun gear 48 and relative to ring gear 60 and will cause rotation of the upper plates 56 and lower plate 58. Therefore, the driven shaft (not shown) that is in engagement with the spline connection 66 will be rotated.

It can thus be seen that the electric motor of the present invention forms an overall disc shape which includes a controller formed of electronic components 70 mounted there within and also is capable of including a planetary gear assembly mounted within the confines of the heat sink 18. Therefore, it is not necessary to utilize a separate controller and a separate planetary gear assembly.

What is claimed is:

1. A brushless electric motor assembly comprising:

a cylindrical hub which has a center through hole;

an annular heat sink attached to said hub, said heat sink being constructed of a heat conductive material, said heat sink being of a larger diameter than said hub, said heat sink having an annular ledge;

a controller including power devices of electronic components being mounted on said annular ledge, heat that is generated within said controller to be conducted through said heat sink;

a stator being fixedly mounted on said hub; and a rotor mounted about said stator, said rotor being secured to a shaft, said shaft being rotatationaly mounted within said center through hole, whereby upon passing of an electrical current through said stator said rotor is rotated which rotates said shaft.

2. A brushless electric motor assembly comprising:

a cylindrical hub which has a center through hole;

an annular heat sink attached to said hub, said heat sink being constructed of a heat conductive material, said heat sink being of a larger diameter than said hub, said heat sink having an annular ledge;

a controller including power devices of electronic components being mounted on said annular ledge, heat that is generated within said controller to be conducted through said heat sink;

a stator being fixedly mounted on said hub;

a rotor mounted about said stator, said rotor being secured to a shaft, said shaft being rotatationaly mounted within said center through hole, whereby upon passing of an electrical current through said stator said rotor is rotated which rotates said shaft; and wherein:

said heat sink including a disc shaped alcove, said center through hole being centrally located within said alcove, a planetary gear system being mounted within said disc shaped alcove, said shaft connecting with said planetary gear system.

3. A brushless electric motor assembly comprising:

a cylindrical cover having an internal compartment;

a disc shaped rotor rotatable mounted within said internal compartment, said rotor being mounted on a shaft, said disc shaped rotor having an internal chamber;

a stator being mounted within said internal chamber, said stator being fixedly mounted on a hub, said hub being located within said internal chamber, said hub having a center through hole, said shaft being located within said center through hole;

a heat sink located exteriorly of said internal chamber, said heat sink being attached to said hub, said hub being mounted on said heat sink, whereby upon passing of an electrical current through said stator said rotor is rotated which rotates said shaft; and a controller including power devices of electronic components which are mounted on said heat sink and located within said internal chamber, heat that is generated within said controller is to be conducted through said heat sink.

4. A brushless electric motor assembly comprising:

a cylindrical cover having an internal compartment;

a disc shaped rotor rotatable mounted within said internal compartment, said rotor being mounted on a shaft, said disc shaped rotor having an internal chamber;

a stator being mounted within said internal chamber, said stator being fixedly mounted on a hub, said hub being located within said internal chamber, said hub having a center through hole, said shaft being located within said center through hole;

a heat sink located exteriorly of said internal chamber, said heat sink being attached to said hub, said hub being mounted on said heat sink, whereby upon passing of an electrical current through said stator said rotor is rotated which rotates said shaft; and said heat sink including a disc shaped alcove, said center through hole being centrally located within said alcove, a planetary gear system being mounted within said disc shaped alcove, said shaft connecting with said planetary gear system.

* * * * *